United States Patent [19]

Reeves et al.

[11] Patent Number: 4,463,043
[45] Date of Patent: Jul. 31, 1984

[54] BUILDING PANEL

[75] Inventors: John F. Reeves; Clarence O. Wahner, both of Brown Deer, Wis.

[73] Assignee: Sprinkmann Sons Corporation, Milwaukee, Wis.

[21] Appl. No.: 296,275

[22] Filed: Aug. 26, 1981

[51] Int. Cl.³ .................. B32B 1/00; B32B 3/00; B32B 27/04; B32B 27/42
[52] U.S. Cl. ............................. 428/68; 428/71; 428/76; 428/119; 428/182; 428/246; 428/268; 428/273; 428/285; 428/313.5; 428/313.9; 428/319.3; 428/421; 428/920
[58] Field of Search ............... 428/312.6, 312.8, 313.5, 428/313.9, 313.3, 319.3, 119, 68, 69, 71, 74, 76, 246, 182, 421, 251, 285, 304.4, 314.4, 314.8, 316.6, 319.1, 319.7, 268, 273, 278, 290

[56] References Cited

U.S. PATENT DOCUMENTS

| | | | |
|---|---|---|---|
| 3,411,256 | 11/1968 | Best | 428/316.6 |
| 3,544,417 | 12/1970 | Corzine | 428/314.4 |
| 3,573,144 | 3/1971 | Andersen | 428/316.6 |
| 4,043,950 | 8/1977 | Wilmsen | 428/920 |
| 4,076,873 | 2/1978 | Shea | 428/268 |
| 4,250,136 | 2/1981 | Rex | 428/313.3 |
| 4,283,462 | 8/1981 | Meyer et al. | 428/524 |
| 4,291,088 | 9/1981 | Wolff | 428/311.5 |
| 4,361,613 | 11/1982 | Bogner et al. | 428/319.3 |
| 4,365,001 | 12/1982 | Meyer et al. | 428/920 |

OTHER PUBLICATIONS

"Effectiveness of Flame Retardant Additives in Furan Resins", Product Bulletin of The Quaker Oats Company, dated Feb. 1978.
"QuaCorr 1200 FR Resin", Bulletin No. 402-A of the Quaker Oats Company, dated Sep. 1978.
"Flame Retardant Furane Resins", Fire Prevention Science and Technology No. 22, date unknown.

Primary Examiner—William J. Van Balen
Attorney, Agent, or Firm—Quarles & Brady

[57] ABSTRACT

A building panel (10, 20, 30, 31, 32, 60 and 70) having spaced first and second outer layers (11, 12), a covering layer (15) bonded to an exterior surface of at least one of the outer layers, and a connecting member (13, 14, 64, 71) extending across the space between the first and second layers and joined to both layers. The first and second outer layers are made of furan resin reinforced with glass fibers.

8 Claims, 15 Drawing Figures

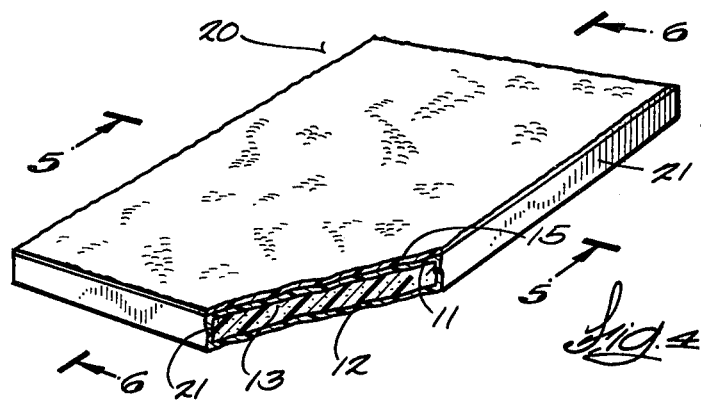
*fig.4*
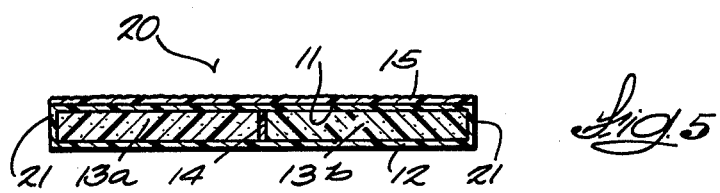
*fig.5*
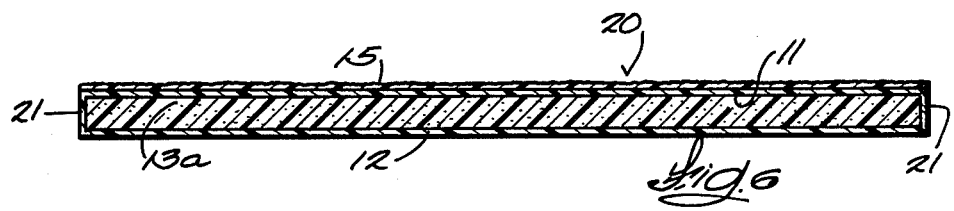
*fig.6*
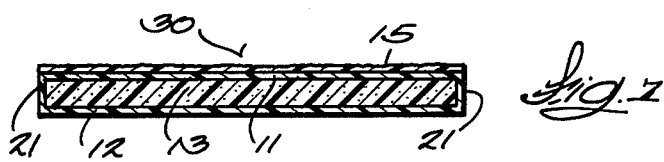
*fig.7*
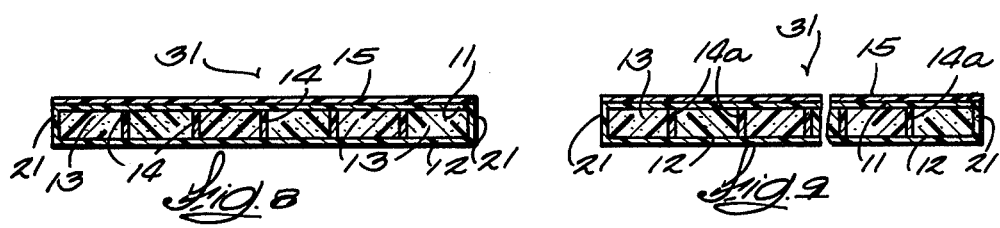
*fig.8* *fig.9*
*fig.10*

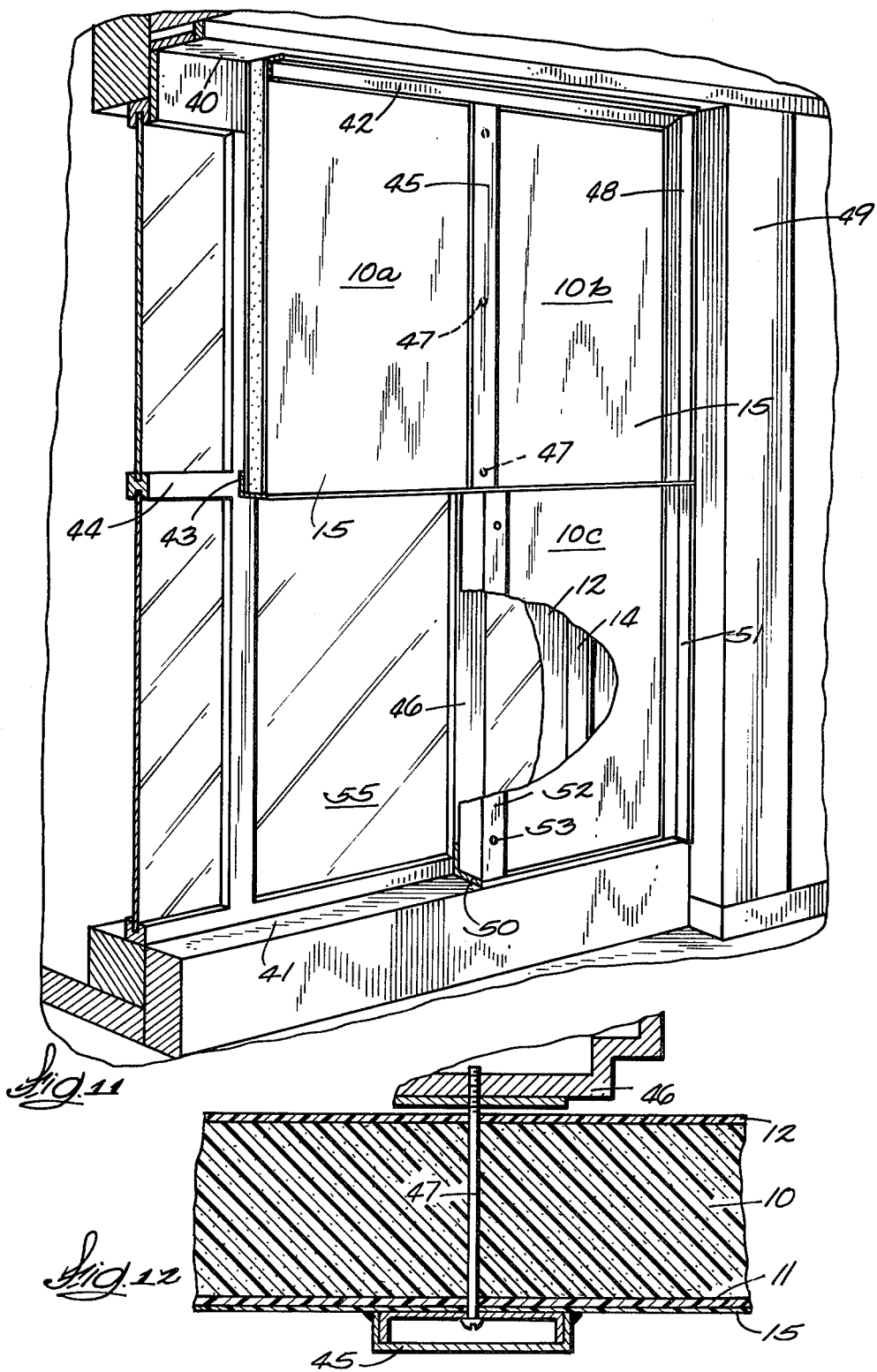

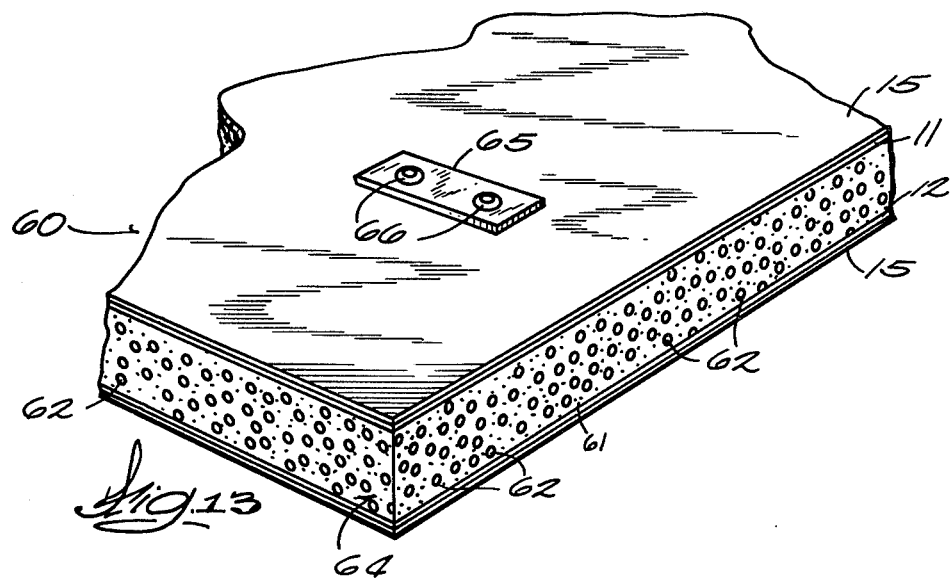
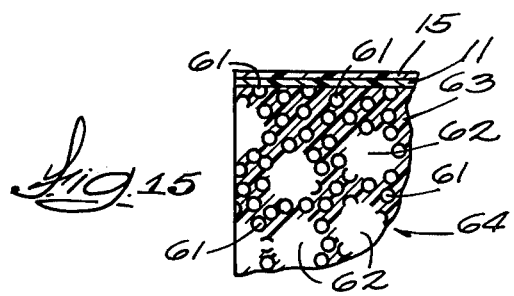
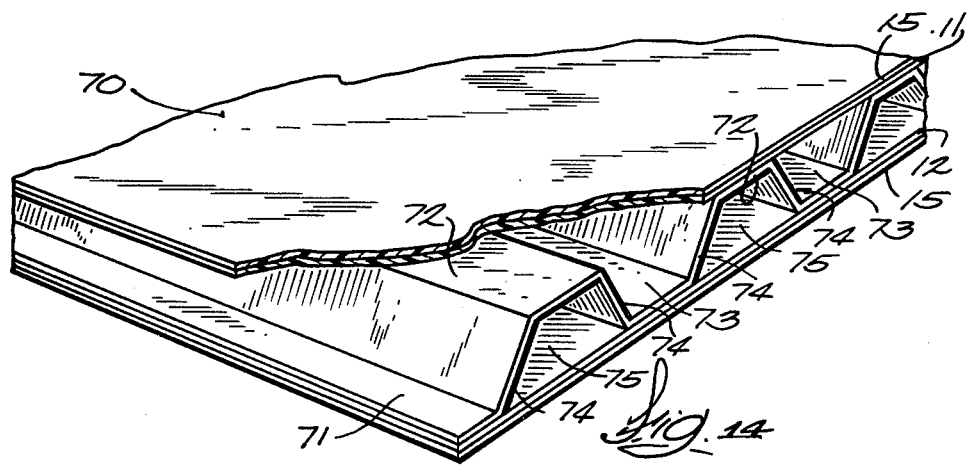

BUILDING PANEL

TECHNICAL FIELD

This invention relates to building panels having improved fire resistant characteristics.

BACKGROUND ART

There is a developing need for a building panel that can be used in various structures such as schools, offices, commercial and industrial buildings, ships, etc. and which will have excellent fire resistance. It would be desirable to provide a highly fire resistant building panel that can be made in various forms suitable for use as an interior or exterior building panel, an insulating or non-insulating panel, or a building panel having high strength and capable of holding mechanical fasteners such as rivets, bolts, etc. A lightweight building panel has maximum utility for most such uses so as not to impose undue additional loading on the structure to which it is attached.

For example, many buildings have been constructed in recent years that have a large number of windows. This has been especially true for large structures such as office buildings, factories, commercial buildings and schools and other municipal buildings. The buildings often utilize a curtain wall type of exterior wall which incorporates a high percentage of window area. The windows are generally responsible for most of the heat loss from a building. The ever-increasing energy costs and contemporary awareness of the need for energy conservation have created a demand for retrofit building panels having high insulating properties that can be applied over the exterior walls of buildings to reduce heat loss, and thereby better control the costs of heating or cooling a building. Further, however, there also is an increased concern regarding the fire resistant characteristics of insulating panels, particularly in the case of municipal buildings such as schools. One type of commercially-available building panel that has been sold to meet this need for an exterior insulating panel is constructed of spaced layers of polyester resin reinforced with fiberglass and having plastic foam between the layers. This type of panel has been sold by the assignee of this application and other companies in the field. While suitable for some installations, panels made with polyester resins have not been able to meet more stringent fire resistant characteristics presently demanded by many building owners and regulatory authorities.

In the case of ships, as another example, it is often desired to incorporate interior building panels in bulkhead partitioning and the like. The panels should have high fire resistance for safety reasons, particularly in the case of naval ships. It is generally required for this type of use, in addition, that the panels exhibit excellent mechanical strength and be able to retain fasteners so that various objects can be secured to the panels.

Also, interior building panels that can be used to cover interior walls or partition open areas into working spaces, for example, desirably should have excellent fire resistance to maximize the safety of the building occupants. In many cases, interior building panels need have low or little insulating properties, although it is also sometimes desirable that they be constructed to provide insulation to reduce thermal losses. It is usually preferable that interior building panels be light in weight in order to minimize the load imposed on the structural elements of a building.

Accordingly, one of the principal objects of this invention was to develop a structural building panel capable of a high degree of fire resistance, yet light enough in weight so as not to overload the existing building structure. A further main object was to develop a fire resistant building panel that can be made as a panel with either high or low insulating characteristics, depending upon the intended end use. Yet another principal object was to provide a fire resistant building panel construction using synthetic plastic materials that can be adapted for use as either an exterior panel or an interior panel. Another was to provide a fire resistant building panel of reinforced plastic material that is capable of holding mechanical fasteners. Another was to develop a fire resistant structural building panel having at least one surface which can be provided with an attractive surface texture or can be painted. Another main object was to develop appropriate methods for the manufacture of building panels of the foregoing types.

DISCLOSURE OF THE INVENTION

Our present invention provides a building panel comprising (1) spaced first and second layers of furan plastic resin reinforced with glass fibers or other suitable reinforcing material, (2) a covering layer bonded to an exposed surface of either the first or second layer, or both, and (3) a connecting member in the space between the first and second layers and joined to the layers. The covering layer provides an attractive surface for the building panel, but it is also employed in our new panel in order to protect the furan resin of the first or second layer against weathering. We have found that the covering layer should be of plastic film (which can be plain or have a decorative surface texture and can be painted) when the panel is exposed to the weather, whereas the covering layer can be a plastic film or a rigid thermoset plastic when it faces the interior of a building or other enclosure. The connecting member may be comprised of various elements as described below, such as plastic foam, glass foam, glass-reinforced webs, or hollow glass or plastic spheres dispersed in furan resin. Our new building panels can be made in various sizes depending upon the intended end use of the product, and in various thicknesses as desired for a particular application. We also provide a method suitable for the production of the foregoing building panels.

DESCRIPTION OF THE DRAWINGS

Several embodiments of the present invention are illustrated in the accompanying drawings wherein:

FIG. 4 is a perspective view of a second building panel according to the present invention;

FIG. 5 is a transverse sectional view of the panel illustrated in FIG. 4;

FIG. 6 is a longitudinal sectional view of the panel of FIG. 4;

FIG. 7 is a transverse sectional view similar to FIG. 3 showing a third building panel according this invention;

FIGS. 8 and 9 are transverse and longitudinal sectional views similar to FIGS. 5 and 6 illustrating a fourth construction for the new building panels;

FIG. 10 is a transverse sectional view similar to FIG. 3 of a fifth embodiment of our new building panels;

FIG. 11 is a perspective view of a portion of a building illustrating one manner in which the building panels of this invention can be applied over the wall;

FIG. 12 is a horizontal sectional view through the mullion of the wall illustrated in FIG. 11;

FIG. 13 is a perspective view of a sixth building panel of the present invention;

FIG. 14 is a perspective view, with a portion broken away of yet another building panel of this invention; and FIG. 15 is an enlarged sectional view of a portion of the panel of FIG. 13.

Figure 1:
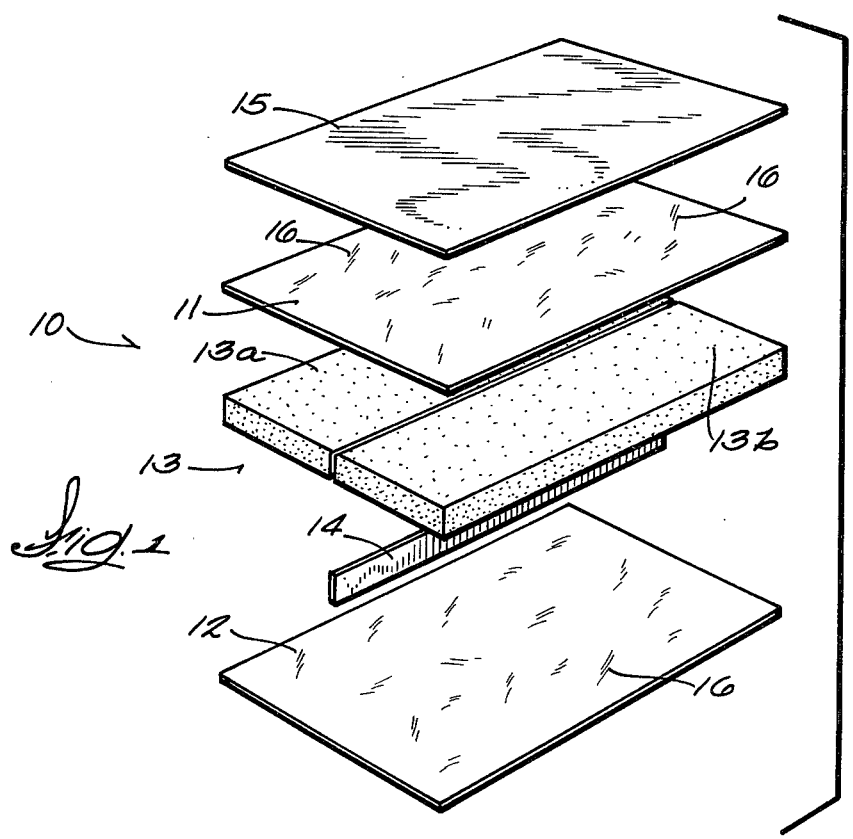
FIG. 1 is an exploded perspective view of a building panel according to our invention.
Figure 2:
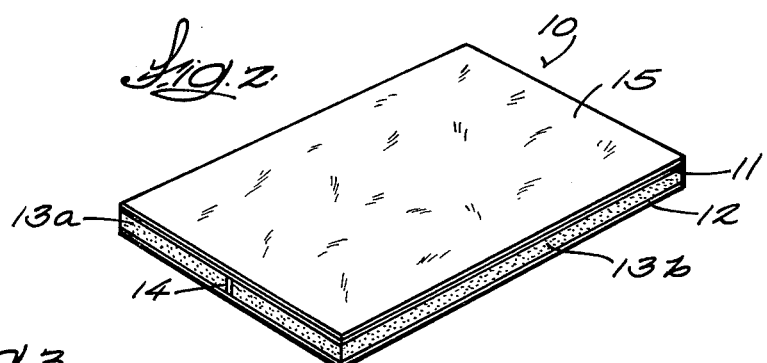
FIG. 2 is a perspective of the panel of FIG. 1.
Figure 3:
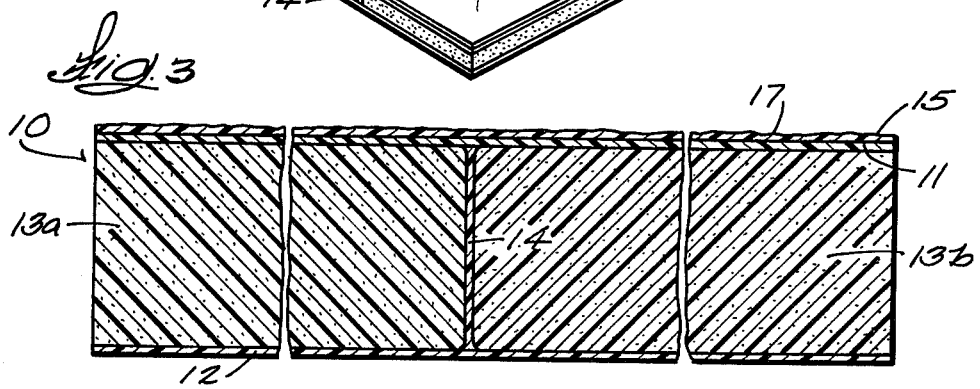
FIG. 3 is a transverse sectional view of the panel of FIGS. 1 and 2.

BEST MODES FOR CARRYING OUT THE INVENTION (a) Panel of FIGS. 1–3

FIGS. 1–3 illustrate a building panel 10 constructed according to the present invention.

The building panel 10 includes a first outer layer 11, a second outer layer 12 and foam insulating material 13, shown as blocks 13a and 13b of plastic or glass foam, positioned between the first and second outer layers. A stiffening web 14 is illustrated as being bonded to the inner surfaces of both the first and second outer layers and connected therebetween. A covering layer 15 is bonded to an exterior surface of the first outer layer 11.

The first outer layer 11 and the second outer layer 12 are each to comprise a layer of cured or hardened furan resin. The term "furan resin" as used in this description and the claims is defined as homopolymers of furfuryl alcohol and copolymers of furfuryl alcohol with comonomers such as furfuraldehyde or formaldehyde. Furan resins are formed by condensation polymerization catalyzed with acids, and the resins cure in an exothermic reaction to a highly crosslinked hardened layer. Furan resins of the type described are available commercially, such as the resins identified under the trademark "Qua-Corr" available from the Quaker Oats Company. The first and second outer layers 11 and 12 may each be reinforced with glass fiber material or other suitable reinforcing materials as indicated by reference numeral 16 in FIGS. 1–2, which can be in the form of chopped fibers, continuous fibers, mat, cloth, woven rovings, uni-directional fibers, etc.

The use of the above class of furan resins in our new building panels is essential in order to obtain the fire resistant characteristics which we desire. Furan resins can be formulated to have excellent fire resistant properties, such as low flame spread, zero fuel contribution, low smoke evolution and minimal emission of toxic products. However, we have found that a cured layer of furan resin exhibits several undesirable characteristics that result in its being unsuitable as an exposed surface of a building panel. Cured furan resin when exposed to sunlight tends to degrade over a period of time; unreinforced furan resin when used to provide a smooth exterior surface tends to crack or craze, a process known as "mud caking", making it difficult to apply paint. Polyester and epoxy gel coats pre-applied to mold surfaces cannot be readily or economically used in conjunction with furan resin layers to protect the surface and impart color because when the furan resins are applied they partially destroy and bleed through or discolor polyester and epoxy gel coats. Also, if the surface of a furan layer was to be the exterior surface of the panel, mold release agents applied to the molds when the panel is manufactured tend to be picked up on the surface of the moldings, and it is difficult to bond protective coating materials to mold release agents or to remove the release agents entirely from moldings so as to obtain good bonding of coatings. Further, furan resins have a dark, almost black, color when in the cured state and are unattractive as an exposed surface for most building panel applications. Lastly, some reinforcing fibers used in the layers may be exposed on the surface of the layer or "bloom" so as to present a surface that is very difficult to paint. Various or all of these characteristics are undesirable features in a building panel and result in a panel that is unacceptable for most purposes.

The covering layer 15 is the second essential element of our new building panels, and we employ it in the panels to overcome the foregoing problems of using furan resins for the first and second layers. The covering layer 15 is bonded to an outer surface of the first layer 11 and forms an outer protective surface that can be readily decorated, such as by painting, to provide a panel that will have an appearance suitable for use on buildings. Further, a two or three-dimensional surface texture can be formed in the covering layer 15 to provide additional decorative effect when desired; a pebbled surface is indicated at 17 in FIG. 3 although a broad range of patterns can be used including leather, slate, wood, sand, stone and brick textures, etc. The formation of the surface texture is described in connection with the method description below. A useful material for the covering layer 15 is flexible sheet or film of synthetic plastic, such as polyester (e.g. polyethylene teraphthlate), acrylic (e.g. polymethyl methacrytate), or polyvinyl fluoride plastic (e.g. that available under the trademark "Tedlar"). The foregoing materials are prefered when the covering layer is an exterior surface exposed to the weather. When the covering layer 15 is an interior surface exposed inside a building or other enclosure, it can be a sheet of rigid thermoset plastic material such as melamine and phenolic or a flexible vinyl sheet or film. In particular, we find most useful a plastic film that will be somewhat softened or attacked by the furan resin of a first or second layer while it is being cured so as to develop a firm strong bond with the plastic film. When the covering layer is a plastic film, it may be of various thicknesses, such as in the range of about 1 to 10 mils. We have found a flexible film of 1.5 mil thick polyvinyl fluoride plastic to be particularly suitable when the covering layer is exposed to the weather. When required, the plastic film can be treated on one or both of its surfaces, such as by corona discharge, to render the film bondable with the furan plastic resins employed for the first or second layers and to enhance its bonding to paints or other coatings. When a rigid thermoset material such as a melamine or phenolic plastic is used as a covering layer, it will generally be thicker, such as up to about 0.030" thick.

The blocks of foam, 13a and 13b, can be of any suitable plastic or glass foam. A rigid closed cell polyurethane foam blown with a high molecular weight fluorocarbon gas (such as "Freon") is particularly effective. Other types of foam material may be employed, including polystyrene and polyethylene foams, glass foam, or phenolic or urea foams. The material for the foam should be selected so as to impart the requisite insulation characteristics and also be able to bond with the furan plastic resins employed in the first and second layers as they are being cured. The bond may be a chemical union or a mechanical bond, such as to a cut surface, or both. Polyurethane plastic foam is preferred when a combination of low heat conductance and good fire resistance is required because it can be selected to have a low flame spread rating and a fuel contribution of zero when tested in accordance with ASTM E-84. The use of pre-cut boards or blocks of plastic foam is preferred because of better control over the finished product, although the material may also be foamed-in-place.

The thickness of the plastic foam can vary in accordance with the thermal transmission characteristics desired for a particular panel. For instance, closed cell polyurethane foam two inches thick will provide an R factor of about 13.4, and is suitable for many applications. (As used in this description, K factor refers to the number of BTUs conducted by material 1″ thick per square foot per 1° F. temperature difference per hour; R is the reciprocal of K.) If the building panels are to be used to provide insulation for refrigerated areas, such as large freezer rooms, the panels can include a foam layer as much as eight to ten inches thick. Thus the thickness of foam used in a particular building panel depends upon the resistance to heat conductance required for the use contemplated for the panels.

The stiffening web 14 is an optional element in the building panel 10. It is added to the panel to increase its structural rigidity so as to stress the layers when the panel is subjected to a bending force. Stiffening webs are especially useful with foam of low strength, such as foam having a density of only 2 lbs./cf. for instance, to more reliably hold the first and second layers in spaced relation and thereby increase the panel stiffness. A stiffening web also acts as a firebreak between separate bodies of foam. The stiffening web 14 can be made up of several layers of glass fiber cloth or other suitable reinforcing material impregnated with the furan resin used for the first and second layers and bonded to the two layers during the manufacture of the building panel. However, other suitable materials can be used for the stiffening webs. The number of stiffening webs employed in a particular panel will depend upon the size of the panel and the rigidity or stiffness that is desired. The number of stiffening webs may also depend on the number of firebreaks desired between bodies of foam. As an example, panels for use as an exterior covering for buildings may have single stiffening webs arranged on 2 foot centers.

The foam 13 and stiffening web 14, in addition to their other functions, combine to form a connecting member joining together the spaced first and second layers of the building panel 10 so as to retain the structural integrity of the panel. Various other elements can be used as a connecting member for this purpose, as illustrated in the alternate embodiments of FIGS. 4–10, 13 and 14 which are described hereinafter.

(b) Panel of FIGS. 4–6

FIGS. 4–6 illustrate a second building panel 20 constructed in accordance with the present invention. The panel 20 incorporates spaced first and second layers 11 and 12, plastic foam 13 between the two layers, a stiffening web 14 connecting the layers 11 and 12, and a covering layer 15 consisting of a plastic film bonded to an outer surface of the first layer 11. Furthermore, however, a side layer 21 extends about the perimeter of the first and second layers and connects their marginal edges together so as to completely enclose or encapsulate the foam 13 within the panel. As indicated in the transverse sectional view of FIG. 5, the side layer 21 covers the two longitudinal sides of the building panel; as illustrated in the longitudinal cross section of FIG. 6, the side layer 21 also covers the two shorter or transverse sides of the building panel. The side layer 21 is to be of the same composition as the first and second layers 11 and 12, i.e. a furan resin layer which may be reinforced with glass fibers as previously described, and may or may not include a covering layer.

(c) Panels of FIG. 7 and FIGS. 8–9

The stiffening web 14, as pointed out above, is an optional element of the present building panels. FIG. 7 is a transverse sectional view (similar to FIG. 3) that illustrates a building panel 30 of the same configuration as the building panel 20, but without any stiffening webs. On the other hand, when a high degree of rigidity or resistance to physical damage is desired, a plurality of stiffening webs may be included in the panels. FIGS. 8 and 9 are transverse and longitudinal sectional views (similar to FIGS. 5 and 6 respectively) of a building panel 31 of the same structure as panel 20 except that it includes a plurality of longitudinal stiffening webs 14 spaced across the width of the panel together with a plurality of transverse stiffening webs 14a to develop an eggcrate or honeycomb type of reinforcing internal stiffening web structure. This type of structure can be employed when maximum panel rigidity is required in all directions. Although illustrated as flat elements in the drawings, the stiffening members may be formed in corrugated, sinusoidal, or other physical configurations.

(d) Panel of FIG. 10

The building panels 10, 20, 30 and 31 described above incorporated a plastic film as a covering layer on the first layer 11, and the plastic films are illustrated as having a surface texture. However, the present building panels also can be made with a covering layer that has a smooth outer surface instead of being textured, and this construction is illustrated in the building panel 32 of FIG. 10. The panel 32 is of the same structure as the building panel 10. The covering layer 15 is a plastic film bonded to the first layer 11 and it has a smooth outer surface, which can be painted or otherwise coated. Furthermore, a covering layer 15 can be bonded to both the first and second layers of the building panel as illustrated in connection with the building panel 32 of FIG. 10 wherein the second layer 12 has a covering layer 15 bonded to it in the same manner as the film 15 is joined to the first layer. This feature is useful for installations in which both the layers 11 and 12 are exposed, and the layers 11 and 12 can have covering layers of the same or dissimilar materials.

(e) Panel of FIGS. 13 and 15

A building panel 60 is illustrated in FIGS. 13 and 15 that includes a first layer 11 and a second layer 12. The first and second layers are spaced from one another and of the same composition as the preceding panels. A covering layer 15 is bonded to the exterior surface of both the first and second layers. Both covering layers 15 are of rigid thermoset plastic material, melamine in the exemplary embodiment.

The spaced first and second layers are joined together by a connecting member 64 that in this embodiment is formed of a mixture of hollow glass or plastic micro spheres 61 and hollow glass or plastic macro spheres 62 dispersed in furan resin 63 that is bonded to both the first and second layers. As depicted in the drawings, the macro spheres 62 are formed by micro spheres which have been bonded together with phenolic resin. Both the micro spheres 61 and macro spheres 62 are commercially available from several sources, including the 3M Company. A combination of micro and macro spheres as in the panel 60 is sometimes referred to as "syntactic foam".

The structure of the building panel 60 is especially suited for applications which require a high strength panel as the connecting member of micro and macro spheres dispersed in furan resin serves to join the first and second layers into a particularly strong rigid structure. Also, such construction provides a building panel having a good insulating characteristic, with a K factor of about 0.50, although it does not provide the high insulating properties of the previous panels. A further advantage of the panel 60 is that it is capable of holding mechanical fasteners. A metal plate 65 is illustrated in FIG. 13 to represent various types of metallic and non-metallic objects and it is fastened to the panel by means of rivets 66 that extend through the first layer 11. Mechanical fasteners are firmly retained in the panel, so that many types of objects can be securely attached to the panel.

(f) Panel of FIG. 14

A building panel 70 is shown in FIG. 14 that comprises spaced first and second layers 11 and 12, each having a covering layer 15 bonded to its outer surface. The first and second layers are joined together by a connecting member comprising an elongate stiffening web 71 that has an undulating or sinusoidal configuration so as to have a plurality of first portions 72 and second portions 73 connected together by intermediate portions 74. The first portions 72 are bonded to the first layer 11 and the second portions 73 are bonded to the second layer 12. The stiffening web 71 can be considered as having a corrugated shape. This construction forms a plurality of side-by-side channels 75 extending in one direction across the interior of the panel 70; the channels 75 can be arranged longitudinally or transversely across the panel, depending on the orientation of the stiffening web 71.

The stiffening web 71 is made of glass mat or cloth which is impregnated with furan resin. It is combined with the first and second layers while the furan resin in the three elements is uncured, so that the furan resin of the stiffening web can bond firmly with furan resin of the first and second layers after curing of the panel has been completed. This provides a rigid building panel 70 of high strength which can be made very light in weight. The panel is also adapted for holding mechanical fasteners, especially when rigid thermoset material is used for the covering layers.

The panel 70 does not have as high an insulating property as the building panels described above. However, dead air space has a K factor of about 0.40; the channels 75 divide the panel 70 into a series of dead air spaces, thereby providing some thermal insulation characteristics.

The building panel 70, like the panels of FIGS. 1–10 and 13, also is highly fire resistant and can be used as a firebreak inside a building or other enclosure.

In the building panel structures described above, various elements are disclosed as a connecting member extending across the space between the first layer 11 and second layer 12 and joined to each layer to retain them in the desired relationship. For the building panels 10, 21, 31 and 32, a combination of foam elements 13 and stiffening webs 14 act as a connecting member; in the building panel 30, foam 13 serves as a connecting member; in the panel 70, the web 71 provides this structure; and in the panel 60, the body of micro spheres 61 and macro spheres 62 in furan resin acts as a connecting member.

(g) Description of Method

The building panels can be constructed according to the method which is now described, which has proved to be an efficient method for making the panels without the need for specialized equipment.

A table is provided that has an air-tight surface and a suitable vacuum pump arranged to exhaust air from the table. If the building panel is to include a surface texture in a covering layer 15, a suitable texture-forming sheet (metal, wood, plastic, etc.) is first placed on the table with its patterned surface exposed. Plastic film, when used as a covering layer, is applied over the patterned surface and sealed around its edges to the table, after which air is withdrawn from between the film and the table by the vacuum pump. This causes the film to hug the patterned surface of the texture-forming element and reproduce its surface structure. A coating of furan resin (e.g. furfuryl alcohol) catalyzed with an acid is applied over the film, and a sheet of permeable glass fiber reinforcing material is set into the coating. The sheet of glass fiber is saturated with additional catalyzed furan resin which is allowed to gel, thereby fixing the patterned film. One or more additional sheets of permeable glass fiber reinforcing material saturated with catalyzed furan resin are then applied over the first sheet and, before this material gels, boards of the selected plastic foam material are placed in position. Pressure is applied to the boards of plastic foam so that they will mate well with the laminate on the table. Next, the second layer 12 is built up over the exposed surface of the blocks of foam using additional layers of permeable glass fiber reinforcing material saturated with the catalyzed furan resin. The assembly is then allowed to cure to a stage in which it may be readily handled, after which the vacuum is released and the resulting sandwich panel is removed from the mold.

The building panels may also be made in an appropriate press or mold, particularly the panels of FIGS. 13 and 14.

EXAMPLE 1

Building panels of the structure shown in FIGS. 4–6 were made using the method described above. The plastic film 15 in the panels was 1.5 mil thick polyvinyl fluoride film (Tedlar) that had been treated for bondability. A texture-forming element was used in the mold to provide a slate surface texture to the film 15. The first and second layers 11 and 12 were made with furan resin (QuaCorr 1200 FR) reinforced with two sheets of glass fiber mat (1½ ounces per square foot), and were a nominal 1/10" thick when cured. The plastic foam material was a 2" thick layer of rigid closed cell polyurethane foam blocks with a density of 2 pounds per cubic foot. The building panels were 4 feet wide by 8 feet long and included a stiffening web 14 along the center of the panel extending parallel to its eight foot length. In the finished panels, the first and second layers were hardened layers of rigid thermoset plastic material, the plastic foam was firmly bonded between the inner surfaces of the two layers, and the plastic film was firmly bonded to the exterior surface of the first layer 11. The exposed surface of the plastic film 15 was painted with a polyurethane-type paint (commercially available under various designations, such as "Imron"). The first and second layers had a Barcol hardness of 40 or more, and an impact strength of 14 pounds per inch of notch-Izod. The panels had an R factor of 13.4. The finished panels were attractive, rigid elements suitable as a non-load-bearing building panel combining efficient insulating characteristics and excellent fire resistance.

Panels of the foregoing construction but without a plastic film covering layer were subjected to a modified corner burn test using the procedure of ASTM E119 in accordance with the International Conference of Building Officials Research Committee Acceptance Criteria for Foamed Plastics under Sec. 1717 of the 1976 Uniform Building Code. The panels achieved a noncombustible zero-hour rating when tested in this manner, which would not have been practical if the panels were made with polyester resins instead of furan resins.

EXAMPLE 2

A building panel 60 as illustrated in FIG. 13 was made with furan resin reinforced with glass mat for the first and second layers 11 and 12, 0.030" thick melamine plastic for the two covering layers 15, and a mixture of hollow micro spheres and macro spheres dispersed in furan resin in the space between the first and second layers. The first and second layers were each nominally 1/10" thick, and the total panel thickness was about ⅝". In the finished structure, the furan resin of the body of hollow micro and macro spheres was firmly bonded to the furan resin of the first and second layers. The panel exhibited a flatwise (i.e., perpendicular to the first and second layers) tensile strength of 750 psi. A 4'×7' panel, supported in a frame, withstood a load of 1,400 pounds applied to its center and deflected only ¼" or less. Rivets, bolts and screws were successfully used to attach various objects to the panel.

The panel of this example provided a fire resistant, lightweight, strong and attractive building panel suitable for use inside buildings, ships, and other enclosures. By using plastic film instead of melamine as for the covering layers, the panel can also be used as an outdoor building panel.

EXAMPLE 3

A building panel 70 of the type shown in FIG. 14 was made with first and second layers of furan resin and glass mat nominally 1/10" thick, covering layers 15 of 0.030" thick melamine plastic, and a corrugated web 71 of furan resin reinforced with glass mat joining together the first and second layers. The total thickness of the panel was about ⅝". The furan resin of the corrugated web 71 was firmly bonded to the furan resin of the first and second layers in the finished panel. The panel, like the panel of Example 2, had a flatwise tensile strength of 750 psi, and a 4'×7' panel supported in a frame deflected only ¼" or less when a 1,400 pound load was applied at its center. Mechanical fasteners such as rivets, screws and bolts, were used successfully to attach objects to the panel.

The panel of this example was a fire resistant, strong and attractive building panel, and had the lowest weight per square foot of the various panels disclosed herein. It is suitable as a building panel for use inside buildings, ships and other enclosures. By using plastic film instead of melamine as a covering layer, the panel can also be used outdoors as an exterior building panel.

INDUSTRIAL APPLICABILITY

The building panels described above are useful as covering panels for application to the exterior walls of buildings. This type of installation is illustrated in FIGS. 11 and 12 wherein panels 10a, 10b and 10c are installed over some of the windows in a curtain wall. The panels 10 are secured in place between the head 40 and the sill 41 of the wall. The plastic film layer 15 of the building panels 10 are on the exposed outer surfaces of the panels to provide a decorative surface. The two upper panels 10a and 10b, are held in position by a metal angle 42 (for example, aluminum) secured along the head of the window and a metal angle 43 that is attached to the rail 44 of the wall structure. A metal batten 45 covers the abutting vertical edges of the two panels; the batten is secured to the mullion 46 of the wall with through fasteners 47 as depicted in the sectional view of FIG. 12. A metal angle 48 is secured to the column 49 of the wall to cover the edge of the panel 10b butting against the column. The lower panel 10c butts against the angle 43 at its upper end, and its lower end butts against angle 50 that is fastened to the sill 41. Another angle 51 is attached to the column 49 along the butt joint between the panel 10c and the column. The panel 10c extends partly across the mullion 46, and angle 52 is attached into position by means of fasteners 53 that extend through one leg of the angle, the panel 10c and into the mullion. The panels 10a–c cover three of the four windows in the wall section illustrated in the FIG. 11. The remaining window 55 is left uncovered so that it may be used for ventilation or viewing. The application of the building panels 10 to the wall in the manner illustrated thus allows for improving the energy efficiency of the building by reducing the amount of heat loss due to conduction, convection or radiation. At the same time, the panels can be installed over the wall so as to cover some of the existing windows but leave others uncovered for continued use if so desired.

The new building panels described herein may also be used as interior nonloadbearing partitions in buildings, such as to enclose rooms or develop working spaces within the building. Also, the building panels can be utilized as walls for a refrigerated or freezer area within a building, in which instance the panels may be made relatively thick to provide a high degree of insulation efficiency.

Our new building panels described herein have a number of useful advantages. The building panels have high impact strength and good weatherability so as to be suitable for exterior use. They are light in weight and do not present load bearing problems from a structural standpoint. The panels can reduce air infiltration into a building on which they are installed and also control moisture penetration; in addition, enclosing the windows in a building can reduce damage by vandalism. They may be used on both single story and multi story buildings. The present building panels require very little if any maintenance. The end user can be offered a wide choice of exterior and interior colors and surface textures, so that the panels are compatible with a variety of architectural styles. Additionally, the building panels can be made for interior use, including installations that require fastening other objects to them. All of these features, can be provided in a building panel which, as previously described, exhibits excellent fire resistance characteristics and can also provide a high or low degree of thermal insulation as desired for a particular end use.

We claim:

1. A building panel comprising, in combination:
   (1) spaced first and second layers, each consisting of furan resin reinforced with glass fiber material and each having an exposed exterior surface;
   (2) a connecting member arranged between the spaced first and second layers and joined to each of said layers; and
   (3) a covering layer bonded to an exterior surface of at least one of the first and second layers, wherein the covering layer is a sheet of flexible plastic film or a sheet of rigid thermoset plastic material.

2. A building panel according to claim 1, wherein: the covering layer is a sheet of flexible polyvinyl fluoride film.

3. A building panel according to claim 1, further including:
   a side layer consisting of furan resin reinforced with glass fiber material extending about the periphery of the first and second layers and connecting their marginal edges together.

4. A building panel according to claim 1, including:
   a covering layer bonded to the exterior surface of both the first and second layers.

5. A building panel according to claim 1, 2, 3 or 4 wherein:
   the connecting member is a body of plastic foam or glass foam insulating material.

6. A building panel according to claim 1, 2, 3 or 4, wherein:
   the connecting member is a combination of foam insulating material and a web of furan resin reinforced with glass fiber material.

7. A building panel according to claim 1, 2, 3 or 4 wherein:
   the connecting member is a body of hollow glass or plastic spheres dispersed in furan resin, and the furan resin thereof is bonded to furan resin of the first and second layers.

8. A building panel according to claim 1, 2, 3 or 4, wherein:
   the connecting member is a web of furan resin reinforced with glass fiber material and having an undulating shape with first portions joined to the first layer and second portions joined to the second layer, the web defining a plurality of channels extending in one direction across the panel, and the furan resin of the web being bonded to furan resin of the first and second layers.

* * * * *